June 13, 1950     W. M. McBRIDE     2,510,992
APPARATUS FOR CONTINUOUSLY INDICATING BEARING
Filed Nov. 5, 1948
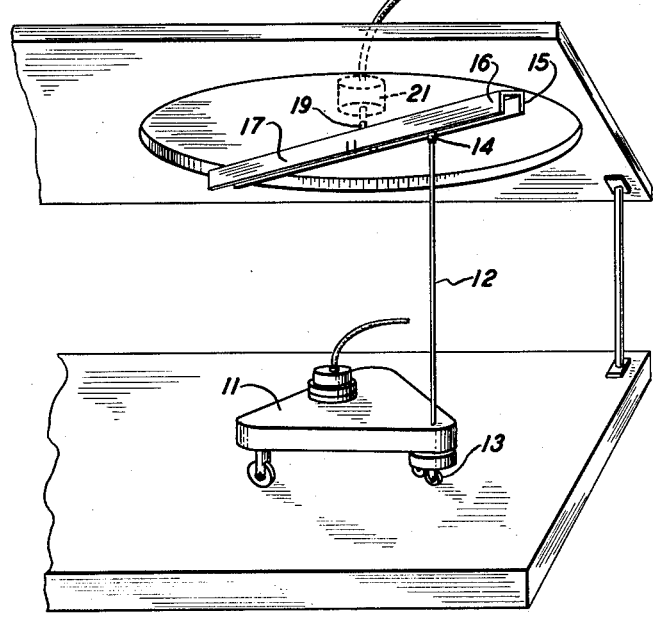
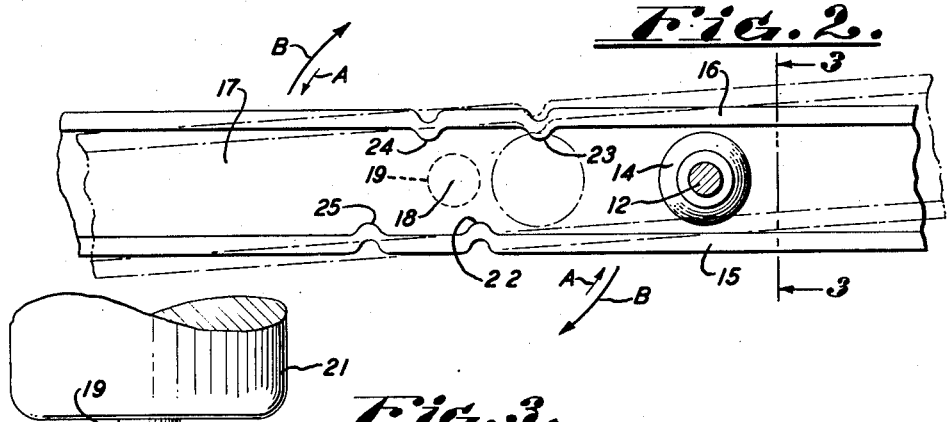
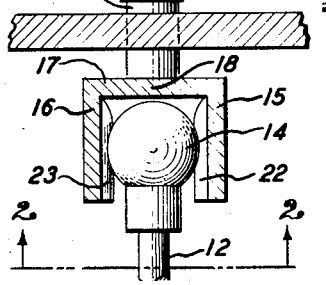
INVENTOR.
WILLIAM M. MC BRIDE
BY
ATTORNEY Patented June 13, 1950

2,510,992

UNITED STATES PATENT OFFICE 2,510,992

APPARATUS FOR CONTINUOUSLY INDICATING BEARING

William M. McBride, San Diego, Calif.

Application November 5, 1948, Serial No. 58,581

12 Claims. (Cl. 35—10.2)

(Granted under the act of March 3, 1883, as amended April 30, 1928; 370 O. G. 757)

This invention relates to an improvement in apparatus for continuously indicating bearing of an object moving with respect to a fixed point and more specifically to an improvement in apparatus for indicating the bearing of a Link trainer recorder moving with respect to a simulated radio station.

The usual Link trainer course recorder used on the Link trainer plotting table is provided with an antenna mounted directly over the marking wheel of the recorder. A plastic ball or tip on the upper end of the antenna rides in a slotted member or channel fixed to the vertically disposed shaft of a synchro-generator which is located directly over the simulated radio station. As the recorder moves about the station, the tip pivots the channel about the shaft, turning the shaft of the synchro-generator, which thereby sends appropriate signals to a synchro-motor in the trainer. A simulated radio compass in the panel of the trainer is actuated by the synchro-motor to continuously show to the pilot the true bearing of the Link trainer with relation to the simulated radio station.

If, in the prior art structure described above, a straight line course directly through the simulated station point were to be maintained, there would be no 180° swing of the channel, and it would be possible to pass over the station without the requisite 180° change in bearing being shown on the trainer compass. The instant invention was designed specifically to rectify this shortcoming.

It is an object of this invention to provide an improvement in apparatus for continuously indicating bearing which will effect the required change of 180° in bearing when a straight course directly through the station point is maintained.

It is another object of this invention to provide means to insure the positive turning of the channel about the station point when a course is maintained directly through the station point.

It is a further object of this invention to simulate in the trainer compass the transient oscillation of a radio compass in a plane as the course passes directly over the radio station.

Other objects and many of the attendant advantages of this invention will be readily appreciated as the same becomes better understood by reference to the following description.

In accordance with the instant invention, the slotted member or channel of the prior art is provided with a primary cam surface extending inwardly from one of its flanges, against which the insulating tip of the antenna pushes, when the recorder is travelling on a course over center, causing the channel to swing quickly thru 180°. To insure that the tip will bump the primary cam surface, and to more closely simulate an actual radio compass, an auxiliary cam surface extending inwardly from the other flange of the channel is provided, spaced further from the pivot axis than the primary cam surface. On approaching the pivot axis of the channel along a path therethru, the tip first pushes the auxiliary cam surface aside thereby bringing the primary cam surface further into the path of the tip, and insuring more positive pushing action to turn the channel about the pivot axis. The auxiliary cam surface also causes transient oscillation on the trainer compass, both when the tip engages the cam surfaces upon approaching the midpoint and when leaving the midpoint after the channel has swung thru 180°, so that the instrument closely simuates the action of an actual radio compass passing over a radio station.

A preferred embodiment of the instant invention has been illustrated in the accompanying drawing, wherein:

Fig. 1 is a perspective view of trainer recorder apparatus embodying the instant invention;

Fig. 2 is a partial view taken on line 2—2 of Fig. 3, illustrating the action of the tip on the cam surfaces of the channel; and Fig. 3 is a sectional view taken on line 3—3 of Fig. 2.

Referring to Fig. 1 of the drawing, 11 designates a course recorder having an antenna 12 mounted directly over the inking wheel 13. A ball or tip 14 of insulating material on the upper end of the antenna 12 rides between the flanges 15 and 16, respectively, of a channel member 17 which is pivotally mounted at its midpoint 18 to the vertically disposed shaft 19 of a synchro-generator 21 located directly over the simulated radio station.

As the recorder 11 moves about the station, or midpoint 18, the tip 14 of the antenna 12 pivots the channel 17 about the midpoint 18, which simulates the location of a radio station, thereby turning the shaft 19 of the synchro-generator 21, which sends appropriate signals to a synchro motor in the trainer (not shown). A compass in the instrument panel of the trainer is actuated by the synchro-motor, thus continuously showing, to the pilot, the true bearing of the Link trainer (wheel 13) with relation to the simulated radio station (point 18).

Extending inwardly from the flanges 15 and 16 respectively, of the channel 17 are embossed a pair of cam surfaces 22 and 23, respectively (Fig. 2). When a straight course directly through the midpoint 18 is maintained, the tip 14, pushing against the cam surface 22, (ignoring for the moment the cam surface 23) causes the channel to spin a full 180°, thus indicating to the pilot that the station has been passed. To insure a more positive pushing action of the tip 14 against the cam surface 22, the tip 14 is first caused to push aside the cam surface 23, thereby bringing the cam surface 22 further into the path of the tip. This arrangement causes the channel, upon the approach of the tip toward the midpoint, to make a slight transient deflection in one direction, graphically illustrated by arrows A, and then make a complete swing of 180° (arrows B), as the tip enters the region directly under the shaft 19. After the channel 17 has turned 180°, the tip 14, having passed the midpoint, again pushes aside the cam surfaces 22 and 23, successively, causing transient oscillation of the channel 17. This oscillation registered on the trainer compass closely resembles the actual behavior of a radio compass while passing over a radio station.

Another pair of coacting cam surfaces 24 and 25, respectively, is provided on the opposite side of the midpoint 18 of the channel to duplicate the spinning action when it is desired to use the tip 14 in the other half of the channel.

*Operation*

In operation, the tip 14 of the antenna 12 mounted directly over the marking wheel 13 of the course recorder 11, rides between the flanges 15 and 16 of the channel 17. Non-radial movement of the recorder 11 about the simulated radio station or midpoint 18 pivots the channel and turns the shaft 19 of the synchro-generator 21 which sends corresponding signals to a compass-actuating synchro-motor in the Link trainer, thus continuously showing the pilot the true bearing of the trainer with relation to the simulated radio station. In the event that a course directly thru the simulated station point is maintained, the tip 14 upon approaching the midpoint pushes against the cam surface 23 on the flange 16, slightly deflecting the channel and thereby bringing further into the path of the tip the cam surface 22 on the flange 16. Continuing to advance, the tip pushes against the cam 22, causing the chanel to spin 180° as the tip comes directly under the shaft 19. This movement, translated by means of the synchro-generator 21 and synchro-motor, appears on the trainer compass as a 180° change in bearing. The tip, on departing from the midpoint, again causes a slight deflection as the cams 22 and 23, successively, are engaged.

The pilot in the trainer, on approaching the simulated radio station or midpoint, sees a momentary oscillation on his compass dial, then a completed 180° reversal in bearing, followed by another momentary oscillation as the tip leaves the midpoint.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for continuously indicating bearing of an object moving with respect to a fixed point comprising a channel member pivotally mounted at its midpoint, a tip riding between the flanges of said chanel member and free to move in a plane normal to the pivot axis of said channel member so that non-radial movement of said tip causes rotation of said channel member, a first cam surface extending inwardly from one of said flanges of said channel member spaced from said pivot axis, a second cam surface extending inwardly from the other of said flanges of said channel member positioned closer to said pivot axis than said first cam surface, whereby said tip upon approaching said axis in a line passing therethrough pushes said cam surfaces aside thereby to spin said channel member through substantially 180°.

2. Apparatus for continuously indicating bearing of an object moving with respect to a fixed point comprising a pivotally mounted channel member, a tip riding between the flanges of said channel member and free to move in a plane normal to the pivot axis of said channel member so that non-radial movement of said tip causes rotation of said channel member, a first cam surface extending inwardly from one of said flanges of said channel member spaced from said pivot axis, a second cam surface extending inwardly from the other of said flanges of said channel member positioned closer to said pivot axis than said first cam surface, whereby said tip upon approaching said axis in a line passing therethrough pushes said cam surfaces aside thereby to spin said channel member through substantially 180°.

3. Apparatus for continuously indicating bearing of an object moving with respect to a fixed point comprising a channel member pivotally mounted at its midpoint, a tip riding between the flanges of said channel member and free to move in a plane normal to the pivot axis of said channel member so that non-radial movement of said tip causes rotation of said channel member, a cam surface extending inwardly from one of said flanges, whereby said tip upon approaching said axis in a line passing therethrough pushes said cam surface aside thereby to spin said channel member through substantially 180°.

4. Apparatus for continuously indicating bearing of an object moving with respect to a fixed point comprising a pivotally mounted channel member, a tip riding between the flanges of said channel member and free to move in a plane normal to the pivot axis of said channel member so that non-radial movement of said tip causes rotation of said channel member, a cam surface extending inwardly from one of said flanges, whereby said tip upon approaching said axis in a line passing therethrough pushes said cam surface aside thereby to spin said channel member through substantially 180°.

5. Apparatus for continuously indicating bearing of an object moving with respect to a fixed point comprising a channel member pivotally mounted at its midpoint, a tip riding between the flanges of said channel member and free to move in a plane normal to the pivot axis of said channel member so that non-radial movement of said tip causes rotation of said channel member, means extending inwardly from one of said flanges, whereby said tip upon approaching said axis in a line passing therethrough pushes said means aside thereby to spin said channel member through substantially 180°.

6. Apparatus for continuously indicating bearing of an object moving with respect to a fixed point comprising a pivotally mounted channel member, a tip riding between the flanges of said channel member and free to move in a plane normal to the pivot axis of said channel member so that non-radial movement of said tip causes rotation of said channel member, means extending inwardly from one of said flanges, whereby said tip upon approaching said axis in a line passing therethrough pushes said means aside thereby to spin said channel member through substantially 180°.

7. Apparatus for continuously indicating bearing of an object moving with respect to a fixed point comprising a member pivotally mounted at its midpoint and having a slot therein, a tip riding in said slot of said member and free to move in a plane normal to the pivot axis of said member so that non-radial movement of said tip causes rotation of said member, a first cam surface extending into said slot from one side thereof spaced from said pivot axis, a second cam surface extending into said slot from the other side thereof positioned closer to said pivot axis than said first cam surface, whereby said tip upon approaching said axis in a line passing therethrough pushes said cam surfaces aside thereby to spin said member through substantially 180°.

8. Apparatus for continuously indicating bearing of an object moving with respect to a fixed point comprising a pivotally mounted member having a slot therein, a tip riding in said slot of said member and free to move in a plane normal to the pivot axis of said member so that non-radial movement of said tip causes rotation of said member, a first cam surface extending into said slot from one side thereof spaced from said pivot axis, a second cam surface extending into said slot from the other side thereof positioned closer to said pivot axis than said first cam surface, whereby said tip upon approaching said axis in a line passing therethrough pushes said cam surfaces aside thereby to spin said member through substantially 180°.

9. Apparatus for continuously indicating bearing of an object moving with respect to a fixed point comprising a member pivotally mounted at its midpoint and having a slot therein, a tip riding in said slot of said member and free to move in a plane normal to the pivot axis of said member so that non-radial movement of said tip causes rotation of said member, a cam surface extending into said slot from one side thereof, whereby said tip upon approaching said axis in a line passing therethrough pushes said cam surface aside thereby to spin said member through substantially 180°.

10. Apparatus for continuously indicating bearing of an object moving with respect to a fixed point comprising a pivotally mounted member having a slot therein, a tip riding in said slot of said member and free to move in a plane normal to the pivot axis of said member so that non-radial movement of said tip causes rotation of said member, a cam surface extending into said slot from one side thereof, whereby said tip upon approaching said axis in a line passing therethrough pushes said cam surface aside thereby to spin said member through substantially 180°.

11. Apparatus for continuously indicating bearing of an object moving with respect to a fixed point comprising a member pivotally mounted at its midpoint and having a slot therein, a tip riding in said slot of said member and free to move in a plane normal to the pivot axis of said member so that non-radial movement of said tip causes rotation of said member, means extending into said slot from one side thereof, whereby said tip upon approaching said axis in a line passing therethrough pushes said means aside thereby to spin said member through substantially 180°.

12. Apparatus for continuously indicating bearing of an object moving with respect to a fixed point comprising a pivotally mounted member having a slot therein, a tip riding in said slot of said member and free to move in a plane normal to the pivot axis of said member so that non-radial movement of said tip causes rotation of said member, means extending into said slot from one side thereof, whereby said tip upon approaching said axis in a line passing therethrough pushes said means aside thereby to spin said member through substantially 180°.

WILLIAM M. McBRIDE.

REFERENCES CITED

The following references are of record in the file of this patent:

UNITED STATES PATENTS

| Number | Name | Date |
| --- | --- | --- |
| 2,438,126 | Muller | Mar. 23, 1948 |
| 2,460,305 | Muller | Feb. 1, 1949 |
| 2,460,877 | Dehmel | Feb. 8, 1949 |
| 2,468,033 | Byers | Apr. 26, 1949 |
| 2,475,314 | Dehmel | July 5, 1949 |